Patented Oct. 31, 1939

2,178,126

UNITED STATES PATENT OFFICE 2,178,126

ALKALI METAL BISMUTH SACCHARATE SOLUTION

Clarence W. Sondern and George Osmore Doak, Kansas City, Mo., assignors to George A. Breon & Company, Inc., Kansas City, Mo., a corporation of Missouri No Drawing. Application February 13, 1937, Serial No. 125,672

2 Claims. (Cl. 167—68)

This invention relates to stable, sterile solutions for intramuscular injection, and with regard to certain more specific features, to stable, sterile solutions of alkali metal bismuth saccharates.

Among the several objects of the invention may be noted the provision of a solution of the class described which, when used, for example, in the treatment of syphilis, offers all of the recognized therapeutical advantages of bismuth, which solution, however, is stable to a degree not heretofore considered possible, in that it develops substantially no precipitate of black metallic bismuth upon aging, even after exposure to light; and the provision of a solution of the class described which is less painful when injected into the muscles, than are similar prior bismuth-containing solutions. Other objects will be in part obvious and in part pointed out hereinafter.

The invention accordingly comprises the ingredients and combinations of ingredients, the proportions thereof, and features of composition, which will be exemplified in the products hereinafter described, and the scope of the application of which will be indicated in the following claims.

The use of bismuth salts in connection with the treatment of syphilis, by subcutaneous or intramuscular injection of solutions of said salts, is well known, and is conceded to be beneficial in a large number of cases. However, difficulties have been encountered with the preparation of suitable bismuth salt solutions for this purpose. Chief among the disadvantages of the bismuth salt solutions heretofore prepared are the following:

(1) The solution is unduly painful when injected into the muscles.

(2) The solution is unstable. A precipitate of black metallic bismuth usually develops on aging for only a relatively short time, particularly after the solution has been exposed to light.

We have found through comparative tests that hypertonic solutions of sucrose render aqueous solutions of alkali metal bismuth saccharates more stable to light and heat, and less painful when injected into muscular tissues. Alkali metal bismuth saccharates are disclosed, for example, in the article by Rosenheim in Zeitschrift für anorganische und allgemeine Chemie, volume 200, pages 173 to 179 (1931), and in the article by Browning and others in Proceedings of the Royal Society of London, series B, volume 102, pages 1 to 9 (1928).

It is desirable, although not necessary, to further incorporate into the solution a local anesthetic, such as benzyl alcohol, to further reduce the pain of injection.

The following example will serve to illustrate the nature of this invention:

200 grams of an alkali metal bismuth saccharate, preferably sodium or potassium bismuth saccharate, is dissolved in 3,000 cc. of distilled water to which is added 1,000 grams of sucrose. The pH of this solution is now adjusted to the order of 8.7 with a small volume of aqueous d-saccharic acid solution, such as a 10% solution. Thereafter, 80 cc. of benzyl alcohol are added to the solution, and the volume is finally adjusted with distilled water to make the total solution measure 4,000 cc. The solution is thereafter filtered in the usual manner. The filtered solution is filled into ampules which are hermetically sealed and then sterilized by heating to 80° C. for one hour, for example.

The solution as thus prepared is quite stable, and no precipitate of black metallic bismuth develops therein even on aging for relatively protracted periods of time, even when the solution is exposed to light. Further, the foregoing solution is substantially painless when injected into the muscles.

It will be understood that the local anesthetic, benzyl alcohol, can be omitted from the foregoing solution, and while the solution will then be somewhat more painful upon injection, it will still be less painful than prior analogous bismuth salt solutions.

It will also be understood that the foregoing exemplary solution is offered for illustrative purposes alone, and that it is possible to vary the concentration, pH values, and other factors without departing from the scope of the invention.

In view of the above, it will be seen that the several objects of the invention are achieved and other advantageous results attained.

As many changes could be made in the above products without departing from the scope of the invention, it is intended that all matter contained in the above description shall be interpreted as illustrative and not in a limiting sense.

We claim:

1. A bismuth solution of stable character, being free from decomposition products after normal periods of storage, and relatively stable against light, adapted for intramuscular injection in conjunction with the treatment of syphilis, comprising an aqueous solution of an alkali metal bismuth saccharate and sugar in amount sufficient to render the solution substantially hypertonic.

2. A bismuth solution of stable character, being free from decomposition products after normal periods of storage, and relatively stable against light, adapted for intramuscular injection in conjunction with the treatment of syphilis, comprising an aqueous solution of an alkali metal bismuth saccharate, sucrose in amount sufficient to render the solution substantially hypertonic, and a local anaesthetic.

CLARENCE W. SONDERN.
GEORGE O. DOAK.